(12) United States Patent
Okuzawa et al.

(10) Patent No.: US 6,413,129 B1
(45) Date of Patent: Jul. 2, 2002

(54) OUTBOARD DRIVE HOUSING COOLING SYSTEM

(75) Inventors: Kazuhiro Okuzawa; Yukio Takeda; Kouei Kokubo, all of Shizuoka (JP)

(73) Assignee: Sanshin Kogyo Kabushiki Kaisha (JP)

( * ) Notice: Subject to any disclaimer, the term of this patent is extended or adjusted under 35 U.S.C. 154(b) by 0 days.

(21) Appl. No.: 09/442,796

(22) Filed: Nov. 18, 1999

(30) Foreign Application Priority Data

Nov. 18, 1998 (JP) .......................................... 10-328376

(51) Int. Cl.[7] .............................................. B63H 20/32
(52) U.S. Cl. ............................ 440/76; 440/78; 440/900
(58) Field of Search ............................... 440/76, 78, 88, 440/89, 900

(56) References Cited

U.S. PATENT DOCUMENTS 3,198,162 A * 8/1965 Larsen ......................... 440/89
4,403,972 A * 9/1983 Bland et al. .................. 440/88
4,421,490 A * 12/1983 Nakahama .................... 440/89
5,501,624 A * 3/1996 Matsumoto et al. .......... 440/88

* cited by examiner

*Primary Examiner*—Ed Swinehart
(74) *Attorney, Agent, or Firm*—Knobbe, Martens Olson & Bear, LLP.

(57) ABSTRACT

An outboard motor includes a power head, driveshaft housing and lower unit, and employs a cooling system to cool the driveshaft housing. Portions of the driveshaft housing experience substantial heat transfer from the exhaust gases that pass through the driveshaft housing. The driveshaft housing cooling system cools the heated portions of the driveshaft housing. The cooling system includes delivery pipes adapted to deliver water to the outer surface of each side of the driveshaft housing. The water is distributed to the housing outer surface in a manner to establish a substantially even flow across the surface so that heat is dissipated from the housing in order to prevent the housing from reaching very high temperatures.

41 Claims, 4 Drawing Sheets

OUTBOARD DRIVE HOUSING COOLING SYSTEM

This application is based on and claims priority to Japanese Patent Application No. 10-328376, filed Nov. 18, 1998, the entire contents of which is hereby expressly incorporated by reference.

BACKGROUND OF THE INVENTION

1. Field of the Invention

This invention relates to an outboard drive and more particularly to a system for cooling a driveshaft housing for an outboard drive.

2. Description of the Related Art

Outboard motors are popular for use in powering watercraft. Such outboard motors typically are affixed to a transom of the watercraft and include a power head, which encloses an engine within a protective cowling. A driveshaft housing depends from the power head and encloses a driveshaft. A lower unit depends from the driveshaft housing and encloses a transmission, which transmits power from the driveshaft to a propeller shaft. A propeller rotates with the propeller shaft, thus propelling the watercraft.

An exhaust system for the engine typically includes an exhaust passage that extends from the engine through the driveshaft housing into the lower unit and terminates at a discharge port in the lower unit. The exhaust system may include various structures including mufflers, expansion chambers and catalysts. In most exhaust passage designs, the exhaust passage is sufficiently close to the driveshaft housing that the heat of the exhaust gases is at least partially transmitted to the driveshaft housing.

Typical outboard motors have no system for cooling the driveshaft housing. Instead, the driveshaft housing is simply exposed to the surrounding atmosphere and relies upon air convection for cooling. Conversely, the lower unit, which depends from the driveshaft housing, is at least partially submerged in water during normal use of the watercraft. Thus, heat transferred from the exhaust gases to the lower unit housing is transferred from the housing to the surrounding water, thus cooling the lower unit.

The driveshaft housing may be heated to high temperatures by the exhaust gases under some operating conditions. As such, the driveshaft housing may sustain heat damage. For example, the external side of the heated driveshaft housing may become discolored by the heat, marring the appearance of the outboard motor.

SUMMARY OF THE INVENTION

Accordingly, a need exists for an outboard drive having a cooling system adapted to dissipate heat transferred to the driveshaft housing from exhaust gases within the exhaust system.

In accordance with one aspect, the present invention provides an outboard motor comprising a power head having an engine and a surrounding protective cowling. A driveshaft housing depends from the power head and at least partially encloses a driveshaft depending from the engine. The driveshaft housing has an outer surface. A lower unit depends from the driveshaft housing and at least partially encloses a transmission, which communicates with the driveshaft. The lower unit also includes a propulsion device. An exhaust system is provided for discharging exhaust gases from the engine. The exhaust system includes an exhaust passage which extends at least partially through the driveshaft housing. A cooling system includes a pump, a delivery conduit communicating with the pump, and at least one outlet. The outlet is arranged so as to deliver coolant from the delivery conduit to at least a portion of the outer surface of the driveshaft housing.

The driveshaft housing can also include an outwardly-extending step formed on the outer surface of the housing. An outer shroud can depend from the protective cowling to a pont adjacent to the step, such that a gap is formed between the step and the outer shroud. The outlet of the cooling system can be positioned between the shroud and the driveshaft housing.

Another aspect of the present invention involves an outboard motor comprising a power head having an engine and a surrounding protective cowling. A driveshaft housing depends from the power head and at least partially encloses a driveshaft depending from the engine. The driveshaft housing includes an outer casing. A lower unit depends from the driveshaft housing and at least partially encloses a transmission which communicates with the driveshaft. The lower unit also includes a propulsion device. An exhaust system discharges exhaust gases from the engine and includes an exhaust guide which extends at least partially through the driveshaft housing. Cooling means is provided for reducing the temperature of at least a portion of the outer casing of the driveshaft housing.

An additional aspect of the present invention involves an outboard drive comprising a housing at least partially enclosing a driveshaft and including an outer surface. A lower unit depends from the housing and at least partially encloses a transmission communicating with the driveshaft. The lower unit includes a propulsion device. An exhaust system is provided and includes an exhaust passage extending at least partially through the housing. A cooling system is also provided and includes a pump, a delivery conduit communicating with the pump, and at least one outlet arranged to deliver coolant from the delivery conduit to at least a portion of the outer surface of the housing.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

DETAILED DESCRIPTION OF THE PREFERRED EMBODIMENT

Figure 1:
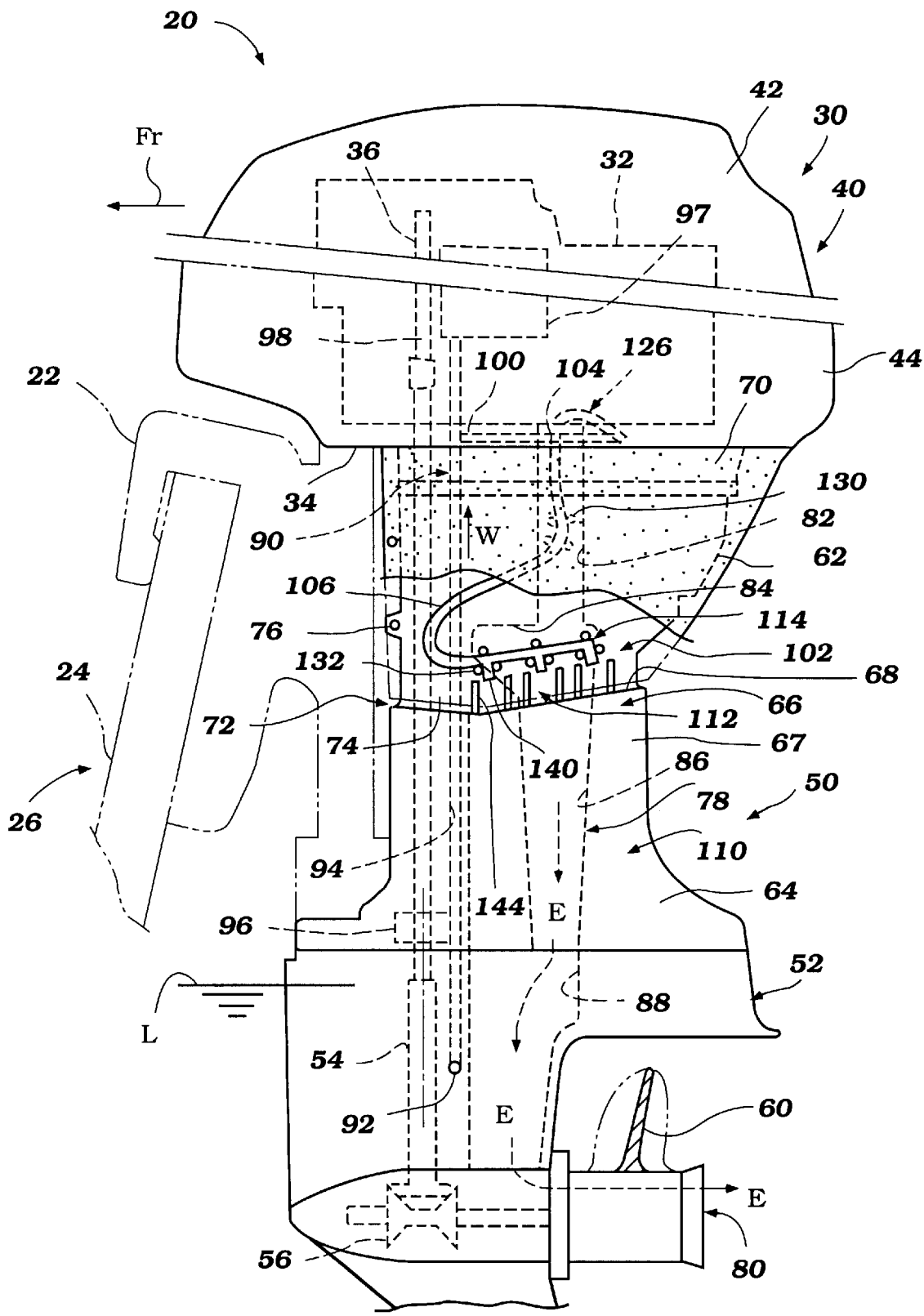
FIG. 1 is a side elevational view of an outboard motor constructed in accordance with an embodiment of the invention, shown attached to the transom of an associated watercraft.

With reference to the drawings and initially primarily to FIG. 1, an outboard motor 20 constructed in accordance with the present invention is illustrated and includes a clamping bracket 22 which is adapted to affix the outboard motor 20 to a transom 24 of a watercraft 26, shown schematically in phantom. The clamping bracket 22 preferably is detachably connected to the transom 24 in any manner known in the art.

The outboard motor 20 includes a power head 30 positioned at an upper end of the motor 20. The power head 30 includes an internal combustion engine 32, shown schematically. The engine 32 is mounted in the power head 30 upon a support plate 34 in a manner so that the engine's crankshaft 36 rotates about a substantially vertical axis. The engine can comprise any engine type suitable for outboard motor use such as, for example, a two cycle, four cylinder, inline engine, or a four cycle engine having six cylinders in a "V" type configuration.

The power head 30 includes a protective cowling 40 that substantially encloses the engine. The protective cowling 40 comprises an upper main cowling portion 42 and a lower tray portion 44.

A driveshaft housing 50 depends from the power head 30 and continues to a lower unit 52, which in turn depends from the lower end of the driveshaft housing 50. In this arrangement, the lower unit 52 is adapted to be at least partially below a water level L when the watercraft 26 is operated in normal operating conditions, while the driveshaft housing 50 remains largely above the water level L.

The engine crankshaft 36 is coupled to a driveshaft 54 which depends into the driveshaft housing 50 and continues to the lower unit 52. A conventional forward, neutral, reverse transmission 56 is provided in the lower unit 52 and is driven by the driveshaft 54. The transmission 56 permits a propeller shaft 58, which is also journaled in the lower unit 52, to be driven in selected forward or reverse directions. In addition, a neutral condition is provided wherein the engine crankshaft 36 and driveshaft 54 may rotate without driving the propeller shaft 58. A propeller 60 is connected to the propeller shaft 58 for propelling the associated watercraft 26 in a well known manner.

The driveshaft housing 50 includes an outer casing 66 having an outer surface 67. An outwardly-extending step 68 is formed in the outer casing so that the casing has a greater cross-sectional area and profile immediately below the step 68 than immediately above the step 68. The section of the driveshaft housing 50 above the step 68 is termed the upper housing portion 62; the section of the driveshaft housing 50 below the step 68 is termed the lower housing portion 64.

Figure 3:
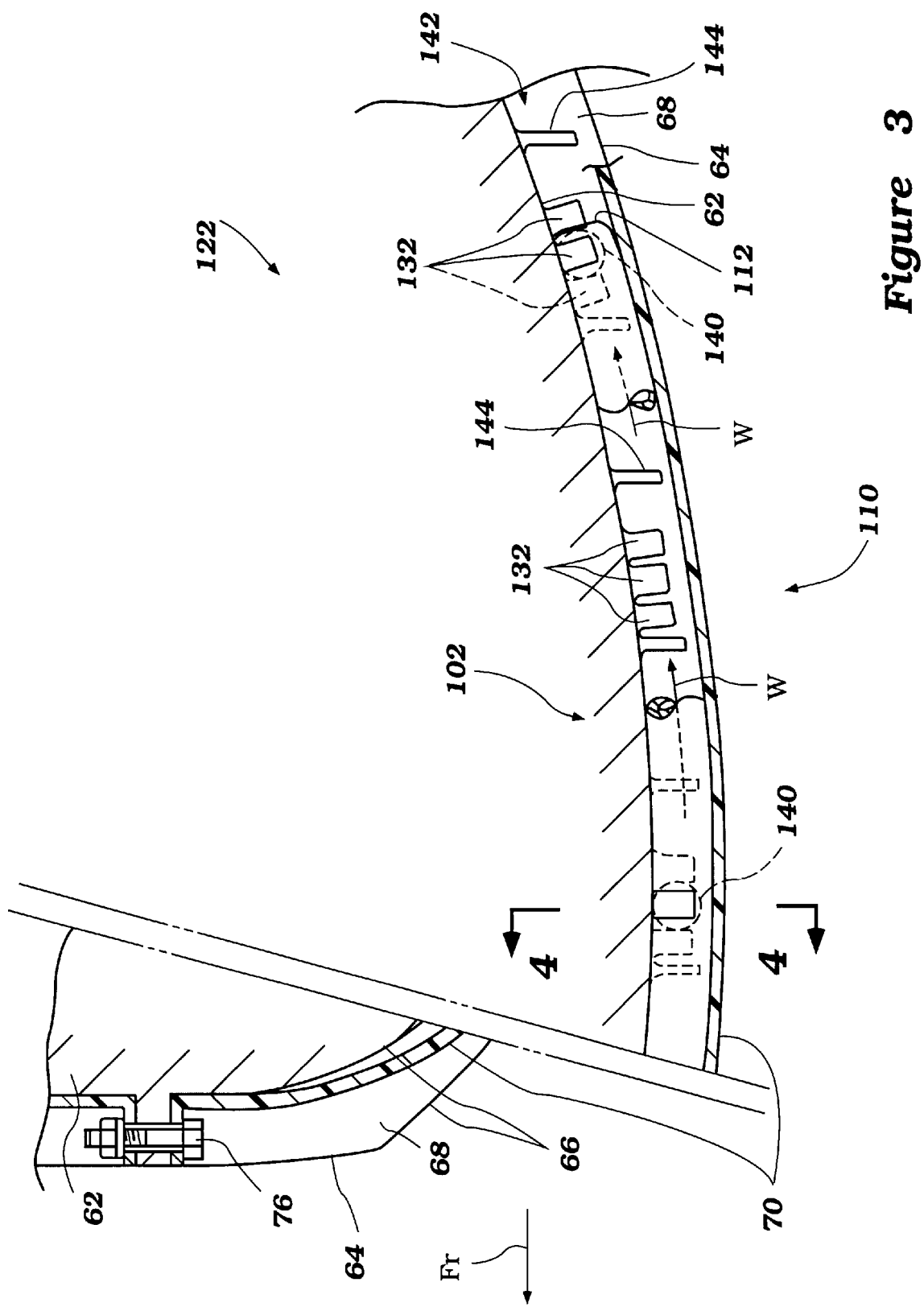
FIG. 3 is an enlarged top view of the coolant delivery area of an outboard motor driveshaft housing having features in accordance with the present invention.
Figure 4:
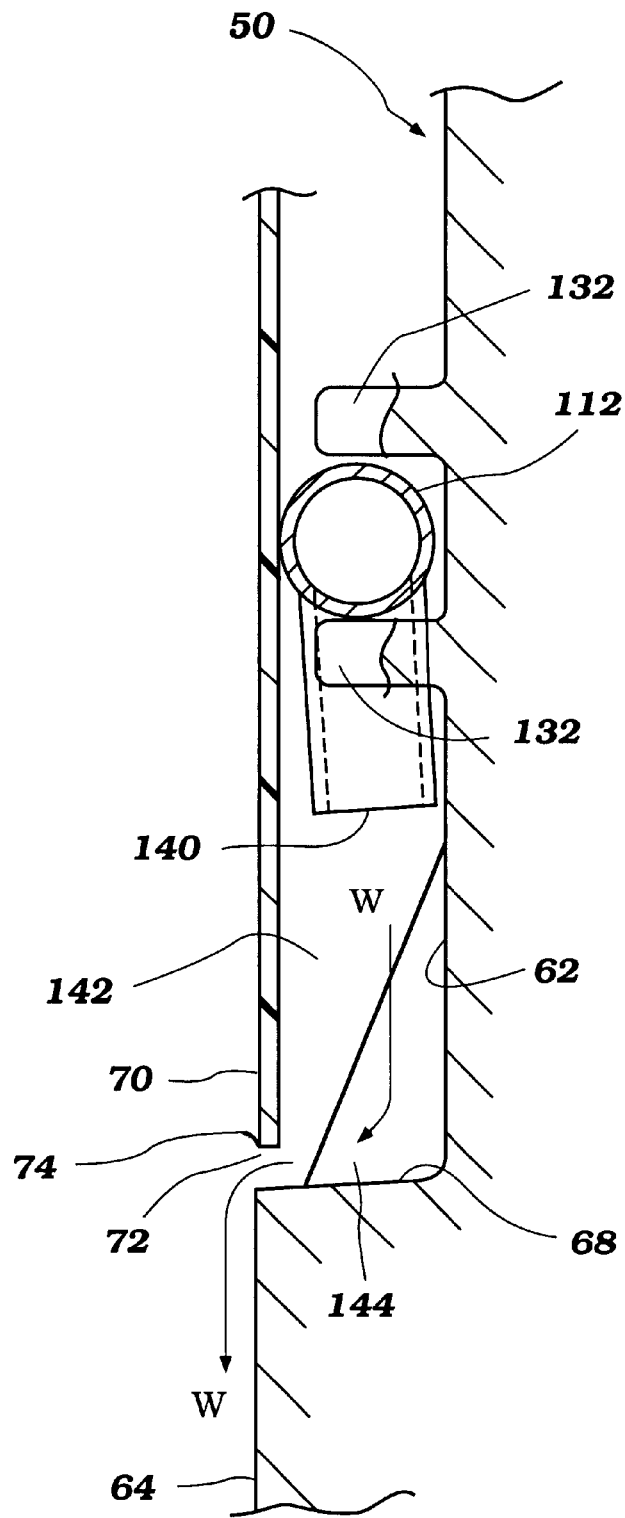
FIG. 4 is an enlarged end view of the coolant delivery area of the outboard motor driveshaft housing of FIG. 3, taken along line 4—4.

An outer shroud 70 depends from the protective cowling 30 to a point adjacent the step portion 68. Thus, as best shown in FIGS. 1 and 4, a slit or gap 72 is formed between a bottom edge 74 of the outer housing 70 and the step 68. The outer shroud 70 is adapted to substantially surround the upper housing portion 62 and, as best illustrated in FIGS. 1 and 3, is preferably secured to the housing 62 with fasteners 76.

Exhaust gases E generated within the engine 32 are routed through an exhaust system 78 which guides gases from the engine 32 through the driveshaft housing 50 and lower unit 52 and out of an underwater exhaust discharge port 80 in the lower unit 52. An idle exhaust discharge (i.e., above-water port) can also communicate with the principal exhaust route through the exhaust system 78. In the embodiment illustrated in FIG. 1, exhaust E from the engine passes through an exhaust pipe 82, which delivers the exhaust to a first exhaust expansion chamber 84. When the exhaust gases E pass from the exhaust pipe 82 into the expansion chamber 84, they expand. This expansion causes silencing of the exhaust gases. Exhaust gases from the first expansion chamber 84 primarily flow through an exhaust guide 86 which preferably includes further muffling means to aid silencing of the exhaust. As exhaust gases E continue through the exhaust system 78, they enter a further exhaust expansion chamber 88 formed at least partially within the lower unit, to again expand and silence the exhaust gases.

The underwater exhaust discharge 80 comprises an annular passage formed in the hub of the propeller 60 which terminates in a rearwardly facing opening. Exhaust gases E within the lower unit expansion chamber 88 exit the motor through the underwater exhaust discharge port 80.

As the exhaust gases E pass through the exhaust system 78, heat from the exhaust gases is transferred to adjacent structures. Some portions of the exhaust system 78 pass close to or even make contact with the outer casing 66 of the driveshaft housing 50. This results in substantial heat transfer from the exhaust gases E to certain areas of the driveshaft housing 50. For example, in the embodiment illustrated in FIG. 1, heat from exhaust gases E is transferred to portions of the driveshaft housing 50 at and below the area surrounding the first expansion chamber 84.

A variety of exhaust system configurations are used in outboard drive practice. The embodiment described above is only an example of a conventional exhaust system. The present invention is adapted to be used with a broad variety of exhaust systems having any exhaust passage arrangement and possibly employing additional or different features such as multiple expansion chambers, multiple discharge ports, additional silencing means, catalysts, water traps, etc. Additionally, the exhaust system may have an underwater discharge port positioned in the lower unit as disclosed above, an above-water discharge port positioned in the driveshaft housing, or both. With each of these exhaust passage arrangements, the high temperature exhaust gases can be expected to transfer heat to the driveshaft housing at various points along the exhaust passage or even throughout the entire exhaust system.

With continued reference to FIG. 1, the engine 32 includes a cooling system 90 for cooling at least the engine 32 with a coolant such as water taken from the body of water in which the watercraft 26 is operating. A coolant intake opening 92 is formed on the lower unit 52 and communicates with a coolant intake pipe 94. A coolant pump 96 is driven off the driveshaft 54 in a known manner and pumps coolant through the intake port 92 and intake pipe 94. Coolant is then delivered to engine cooling jackets 97 through an engine intake pipe 98 in a manner conventional in the art.

A housing cooler supply conduit 100 branches off the coolant intake pipe 94 to supply coolant to a driveshaft housing cooling system 102. The housing cooler supply conduit 100 is preferably positioned in the power head 30 within the protective cowling 40. The supply conduit 100 communicates with a connector 104 which bifurcates the line into first and second delivery pipes 106, 108.

Figure 2:
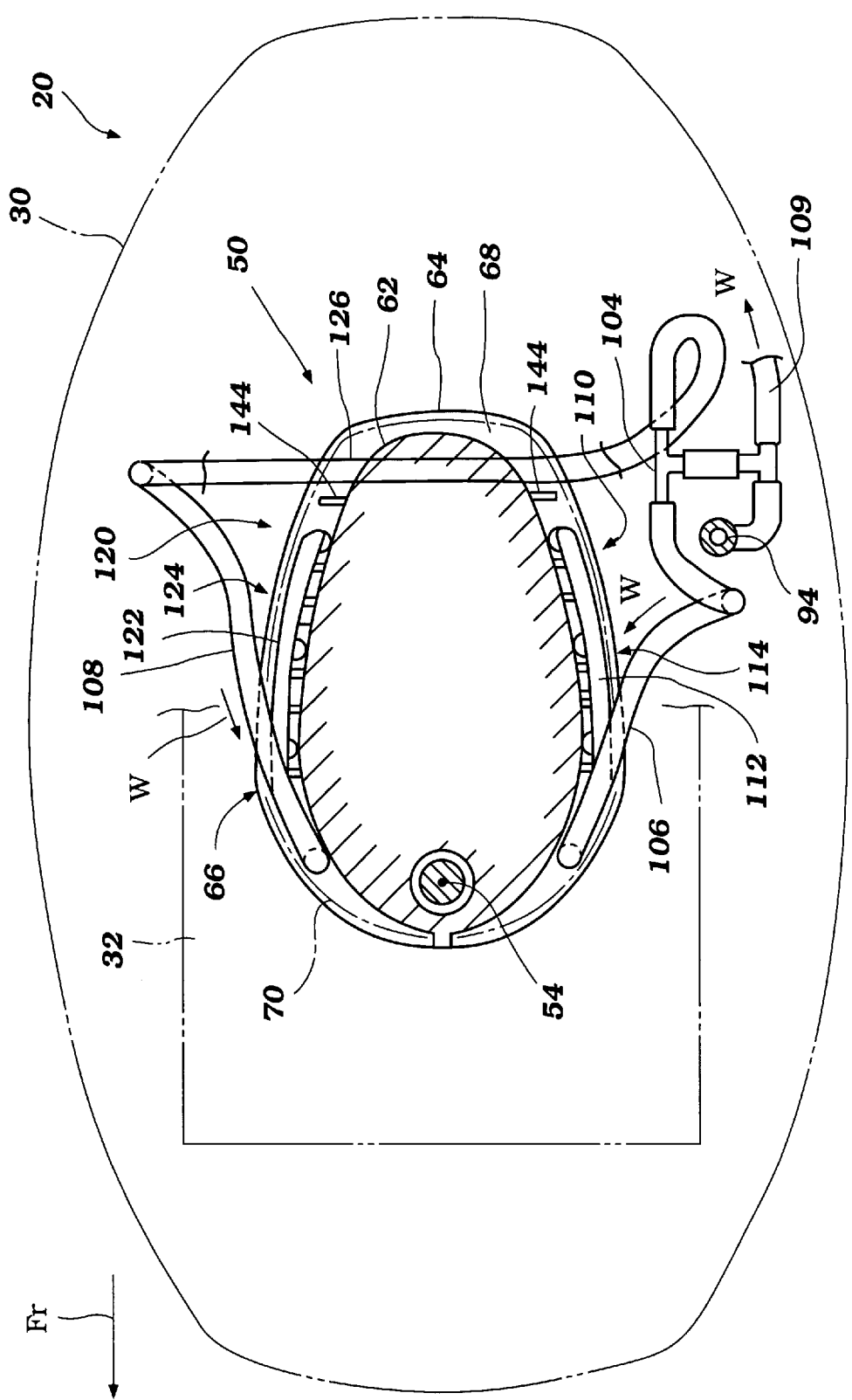
FIG. 2 is a top view of a driveshaft housing employing another embodiment of the driveshaft housing cooling system of the present invention, showing the power head of the outboard motor in phantom.

FIG. 2 shows a variation of the coolant supply arrangement in which the coolant intake pipe 94 further communicates with a secondary cooling pipe 109. The secondary cooling pipe 109 delivers coolant to additional cooling systems and/or to a telltale port (not shown). In another variation, the housing cooling system employs a dedicated coolant intake port and a coolant pump which operates independent of the engine cooling system.

As shown in FIGS. 1 and 2, the first delivery pipe 106 extends from the cowling 40, along a first external side 110 of the driveshaft housing 50, and to a delivery manifold 112 positioned in a coolant delivery area 114. The second delivery pipe 108 extends from the cowling 40, along a second external side 120 of the driveshaft housing 50, and to a secondary delivery manifold 122 positioned in a second coolant delivery area 124.

Although the illustrated embodiment shows a system employing two delivery pipes 106, 108, another embodiment can use only a single delivery pipe and deliver coolant only to selected location(s) on one or both sides 110, 120 of the driveshaft housing 50.

As shown in FIG. 2, the coolant intake pipe 94 is preferably oriented to one side of the motor 20. The second delivery pipe 108 includes a cross-over portion 126 which crosses underneath the engine 32 from the first side 110 to the second side 120 of the driveshaft housing 50.

The outer shroud 70 depends from the protective cowling 40 and encloses the delivery pipes 106, 108 such that the delivery pipes 106, 108 and manifolds 112, 122 are positioned between the driveshaft housing 50 and the outer shroud 70. In another embodiment, the delivery pipes can be positioned within the driveshaft housing 50.

The coolant intake pipe 94, coolant supply conduit 100, and delivery pipes 106, 108 are preferably formed of flexible tubular hose known in the art. It is to be understood, however, that rigid pipe and other materials may be used as appropriate.

A plurality of pipe guides 130 extend from the upper housing portion 62 between the power head 30 and coolant delivery areas 114, 124 and hold the delivery pipes 106, 108 in a desired position. Positioning pins 132, which also extend from the upper housing portion 62, hold the delivery manifolds 112, 122 in position. In the illustrated embodiment, each delivery manifold 112, 122 includes three downwardly-extending outlet ports 140 which deliver coolant from the delivery pipes 106, 108 into a space 142 between the outer shroud 70 and the upper housing portion 62. The outlet ports 140 are arranged to lie in the same generally-horizontal plane. Coolant W from the outlet ports 140 flows between the shroud 70 and upper housing portion 62 into contact with the step 68 and is directed both along the step 68 and out of the gap 72 between the outer shroud 70 and step 68. With more specific reference to FIGS. 3 and 4, ribs or guides 144 extend from the step 68 and upper housing 62. The manifolds 112, 122 and guides 144 are adapted to distribute the coolant W so that coolant flowing through the gap 72 will cascade down the outer surface 67 of the lower housing portion 64 in a substantially even sheet, cooling the housing and preventing the housing temperature from reaching extremely high levels.

The coolant delivery areas 114, 124 are preferably positioned so as to maximize the efficiency of the housing cooling system 102. As discussed above, certain areas of the driveshaft housing 50 may experience especially great heat transfer from hot exhaust gases E to the driveshaft housing 50. The housing cooling system 102 is thus preferably adapted to focus coolant delivery to these areas. For instance, in the illustrated embodiment, the driveshaft housing 50 experiences the greatest heat transfer in the areas adjacent to and below the first exhaust expansion chamber 84, which is about midway between the power head 30 and the lower unit 52. Thus, the coolant delivery areas 114, 124 are positioned about midway between the power head 30 and the lower unit 52, so that coolant flows along the housing 50 surfaces at and below these areas. The coolant delivery areas may be positioned at any point along the driveshaft housing 50 between the power head 30 and lower unit 52. Similarly, the step 68 between the upper and lower housing portions can be arranged at any desired location.

Although the illustrated embodiment shows the coolant delivery areas 114, 124 symmetrically arranged on opposing sides 110, 120 of the driveshaft housing 50, other embodiments can have areas of high heat transfer defined at positions the housing not having such a symmetrical relationship. Additionally, some embodiments can employ only one coolant delivery area, while others can use three or more.

Additional embodiments of the present invention can also be employed. For instance, the outer shroud can be located and positioned so as to create a gap between the outer shroud and the driveshaft housing without requiring the use of a step formed in the housing. Similarly, the outlet ports may include nozzles adapted to distribute coolant evenly along the driveshaft housing without requiring ribs, guides, or other means for distributing the coolant. Further, the outlet ports may be adapted to deliver and distribute coolant along the driveshaft housing without using an outer shroud.

The illustrated embodiment describes the housing cooling system as applied to a conventional outboard motor. Those skilled in the art will readily appreciate that the present invention can be applied to stem drive units, to inboard drive units and to other types of watercraft drive units as well. Thus, as used herein, "outboard drive" generically means an outboard motor, a stem drive, an inboard drive, and all similar marine propulsion systems and devices. Any suitable portion of such an outboard drive may employ a cooling system having features such as those described above in order to cool portions of the outboard drive.

Although this invention has been described in terms of certain preferred embodiments, other embodiments apparent to those of ordinary skill in the art are also within the scope of this invention. Accordingly, the scope of the invention is intended to be defined only by the claims that follow.

What is claimed is:

1. An outboard motor comprising a power head having an engine and a surrounding protective cowling, a driveshaft housing depending from the power head and at least partially enclosing a driveshaft depending from the engine, the driveshaft housing including an outer surface, a lower unit depending from the driveshaft housing and at least partially enclosing a transmission communicating with the driveshaft, the lower unit including a propulsion device, an exhaust system for discharging exhaust gases from the engine, the exhaust system including an exhaust passage extending at least partially through the driveshaft housing, and a cooling system including a pump, a delivery conduit communicating with the pump and configured to deliver coolant from the pump to a plurality of conduit openings, and at least one elongate outlet, the plurality of delivery conduit openings arranged adjacent the elongate outlet, the elongate outlet arranged to deliver coolant from the plurality of delivery conduit openings to at least a portion of the outer surface of the driveshaft housing, said elongate outlet configured so as to produce a sheet flow of coolant generally cascading down at least a portion of the outer surface.

2. An outboard motor as in claim 1, wherein the cooling system includes another elongate outlet, and one elongate outlet is arranged to supply coolant to a first side of the driveshaft housing, and the other elongate outlet is arranged to supply coolant to a second side of the driveshaft housing.

3. An outboard motor as in claim 1, wherein the cooling system includes a manifold having a plurality of outlets, each adapted to deliver coolant from the delivery conduit to the outer surface of the driveshaft housing.

4. An outboard motor as in claim 1, wherein the cooling system additionally includes an inlet conduit that extends from the pump and connects to the delivery conduit so as to place the delivery conduit in communication with the pump, and the delivery conduit is connected to the inlet conduit within the protective cowling.

5. An outboard motor as in claim 4, wherein the inlet conduit communicates with a cooling jacket of the engine.

6. An outboard motor as in claim 4, wherein at least a portion of the inlet conduit is a tubular hose, and at least a portion of the delivery conduit is a tubular hose.

7. An outboard motor as in claim 1, wherein the outlet is arranged to deliver coolant to a portion of the outer surface of the driveshaft housing that lies next to the exhaust passage defined within the driveshaft housing.

8. An outboard motor as in claim 1, wherein the driveshaft housing includes an outwardly-extending upwardly-facing step formed on the outer surface of the housing, and an outer shroud depends from the protective cowling to a point adjacent to the step, such that a gap is formed between the step and the outer shroud, and the outlet of the cooling system comprises the gap between the shroud and the driveshaft housing.

9. An outboard motor as in claim 8, wherein the gap has a sufficient size to allow coolant from the outlet to flow therethrough.

10. An outboard motor as in claim 8 additionally comprising a plurality of coolant guides extending generally upwardly from the step.

11. An outboard motor as in claim 10, wherein the coolant guides are adapted to coordinate a flow of coolant from the conduit openings through the outlet with substantially even distribution over a portion of the driveshaft housing outer surface.

12. An outboard motor as in claim 8, wherein the cooling system includes a first and second coolant line that communicates with the delivery conduit, and the first coolant line delivers coolant to the outlet on a first side of the driveshaft housing, and the second coolant line delivers coolant to a second outlet on a second side of the driveshaft housing.

13. An outboard motor as in claim 12, wherein each coolant line communicates with a plurality of elongate outlets.

14. An outboard motor as in claim 13, wherein the conduit openings are arranged generally next to each other on generally the same horizontal plane.

15. An outboard motor as in claim 14 additionally comprising mounts adapted to hold the conduit openings in a desired arrangement.

16. An outboard motor as in claim 1, wherein the sheet flow is substantially evenly distributed and continuous.

17. An outboard motor as in claim 8, wherein an outer surface of the outer shroud above the step is substantially coplanar with the outer surface of the housing below the step.

18. An outboard motor as in claim 17, wherein a lower edge of the outer shroud is directly above an upwardly-facing surface of the step.

19. An outboard motor as in claim 10, wherein the coolant guides comprise plates.

20. An outboard motor as in claim 10, wherein at least one of the coolant guides is positioned between adjacent conduit openings.

21. An outboard drive comprising an engine at least partially enclosed by a protective cowling, a housing at least partially enclosing a driveshaft, the housing including an outer surface, a shroud depending from the protecting cowling and overlapping at least a portion of the housing, the housing and shroud configured so that a lower edge of the shroud is spaced from the housing outer surface so as to create an elongate gap therebetween, a lower unit depending from the housing and at least partially enclosing a transmission communicating with the driveshaft, the lower unit including a propulsion device, an exhaust system including an exhaust passage extending at least partially through the housing, the exhaust system heating at least a portion of the housing, and a cooling system including a pump, a delivery conduit communicating with the pump, and at least one outlet arranged to direct a substantially continuous flow of coolant from the delivery conduit into a space between the shroud and housing so that coolant flows through the elongate gap and onto a heated portion of the outer surface of the housing when the pump is operating.

22. An outboard drive as in claim 21, wherein the cooling system includes another outlet, and one outlet is arranged to supply coolant to a first side of the housing, and the other outlet is arranged to supply coolant to a second side of the housing.

23. An outboard drive as in claim 21, wherein the cooling system includes a manifold having a plurality of outlets, each adapted to deliver coolant from the delivery conduit to the space between the housing and the shroud.

24. An outboard drive as in claim 21, wherein the outlet is arranged to deliver coolant to a portion of the outer surface of the housing that lies next to the exhaust passage defined within the driveshaft housing.

25. An outboard drive as in claim 21, wherein the housing includes an outwardly extending upwardly-facing step formed on the outer surface of the housing, and the lower edge of the shroud is arranged immediately above the step, and the outlet of the cooling system is directed onto the step.

26. An outboard drive as in claim 25 additionally comprising a plurality of coolant guides extending upwardly from the step.

27. An outboard drive as in claim 26, wherein the coolant guides are adapted to direct a flow of water from the outlet through the gap with substantially even distribution over the portion of the housing outer surface.

28. An outboard drive as in claim 25, wherein the cooling system includes a first and second coolant line that communicates with the delivery pipe, and the first coolant line delivers coolant to the outlet on a first side of the housing, and the second coolant line delivers coolant to a second outlet on a second side of the housing.

29. An outboard drive as in claim 28, wherein each coolant line communicates with a plurality of outlets.

30. An outboard drive as in claim 29 additionally comprising mounts adapted to hold the outlets in a desired arrangement.

31. An outboard drive as in claim 21, wherein the housing comprises a plurality of outwardly extending coolant flow guides configured to substantially evenly distribute coolant within the space between the housing and the shroud.

32. An outboard drive as in claim 31, wherein the delivery conduit has a plurality of outlets, and a guide member is positioned between each of the outlets.

33. An outboard drive as in claim 25, wherein an outer surface of the shroud above the step is generally coplanar with the housing outer surface immediately below the step.

34. An outboard drive as in claim 25, wherein the gap is arranged so that water flows generally horizontally therethrough.

35. An outboard drive as in claim 26, wherein the guides are substantially hidden from view by the shroud.

36. An outboard drive comprising an engine at least partially enclosed by a protective cowling, a housing at least partially enclosing a driveshaft, the housing including an outer surface having an outwardly extending generally upwardly-facing step formed thereon, an outer shroud formed separately from the housing and depending from the protective cowling to a point adjacent to the step, such that a gap is formed between the step and the outer shroud and a space is defined between the housing and the shroud, a lower unit depending from the housing and at least partially enclosing a transmission communicating with the driveshaft, the lower unit including a propulsion device, an exhaust system including an exhaust passage extending at least partially through the housing, and a cooling system including a pump, a delivery conduit communicating with the pump, and at least one outlet positioned in the space between the shroud and the housing, the outlet being arranged to deliver coolant from the delivery conduit into the space so that the coolant flows through the gap to at least a portion of the outer surface of the housing immediately below the shroud.

37. An outboard drive as in claim 36 additionally comprising a plurality of coolant guides extending upwardly from the step.

38. An outboard drive as in claim 37, wherein the coolant guides are adapted to direct a flow of water from the outlet through the gap with substantially even distribution over the portion of the housing outer surface.

39. An outboard drive as in claim 36, wherein the cooling system includes a first and second coolant line that communicates with the delivery pipe, and the first coolant line delivers coolant to the outlet on a first side of the housing, and the second coolant line delivers coolant to a second outlet on a second side of the housing.

40. An outboard drive as in claim 39, wherein each coolant line communicates with a plurality of outlets.

41. An outboard drive as in claim 40 additionally comprising guides adapted to hold the outlets in a desired arrangement.

* * * * *